Aug. 11, 1925.
M. TAYLOR
SAW FILING MACHINE
Filed July 26, 1924
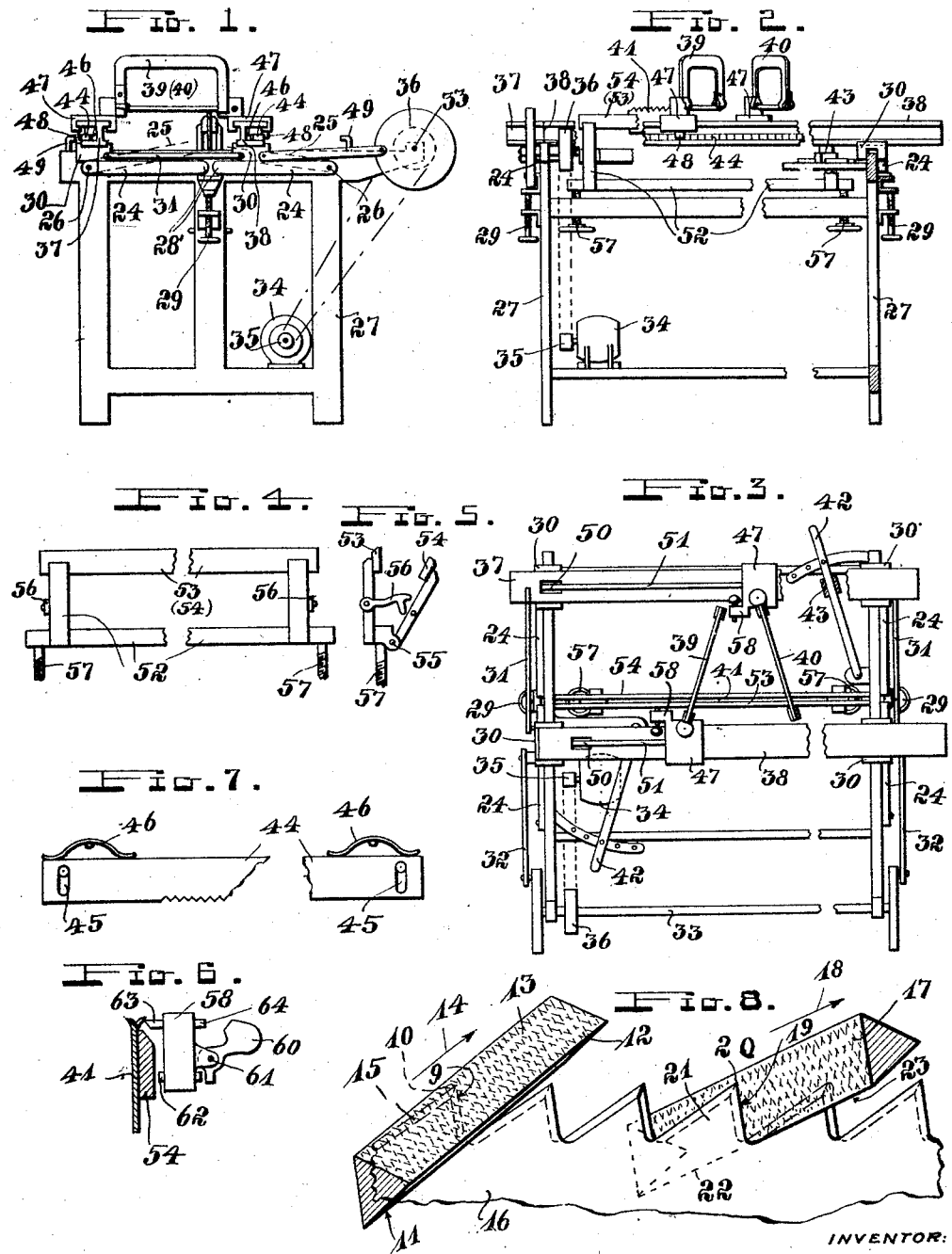
INVENTOR:
MICHAEL TAYLOR,
By: Otto H. Rueger,
his Atty.

Patented Aug. 11, 1925.

1,549,694

UNITED STATES PATENT OFFICE.

MICHAEL TAYLOR, OF KANSAS CITY, MISSOURI.

SAW-FILING MACHINE.

Application filed July 26, 1924. Serial No. 728,476.

*To all whom it may concern:*

Be it known that I, MICHAEL TAYLOR, a citizen of the United States, residing at Kansas City, in the county of Jackson and State of Missouri, have invented a new and useful Saw-Filing Machine, of which the following is a specification.

This invention relates to devices used for sharpening saws.

One of the objects of this invention is to provide a device by which the teeth of a saw can be sharpened mechanically in one operation.

Another object is to provide means for setting a file at a suitable angle in relation to the teeth of a saw.

Another object is to provide a saw-setting mechanism to be actuated on each stroke of a file through a saw.

Another object is to provide feeding means by which a file can be forwarded from tooth to tooth on each stroke of the file.

Another object is to provide adjusting means by which a saw can be slightly forwarded for a second and finishing filing in relation to the files, without that the saw has to be removed from the saw-holder below the files.

Another object is to provide means by which a file can be set to operate at an incline to a horizontal plane.

Another object is to provide file supporting and actuating means by which two files can be operated from opposite sides through a saw at different angles to the saw.

Other objects will appear from the following description and appended claims as well as from the accompanying drawing, in which—

Fig. 1 is an end elevation of a saw-filing machine embodying my invention.

Fig. 2 is a fragmentary front elevation of the machine in Fig. 1 being partly broken away to more clearly show some of the parts in their relation to one another.

Fig. 3 is a fragmentary top plan view of the machine in Figures 1 and 2, being partly broken away to show the inter-connections of different parts.

Fig. 4 is a fragmentary detail front elevation of a saw-holding frame structure.

Fig. 5 is a fragmentary end elevation of the saw-holder in Fig. 4.

Fig. 6 is a fragmentary detail end elevation of a saw-setting device.

Fig. 7 is a fragmentary detail top plan view of a ratchet-bar.

Fig. 8 is a fragmentary side elevation of a saw, having in dotted lines two short pieces of files indicated therein to illustrate different positions of a file in relation to the teeth of a saw.

The cutting edge of a saw must be normally at an incline transversely to the longitudinal body of the saw. At the same time it is sometimes desirable that a file be held lower at the rear end to produce a fine cutting edge on the teeth of a saw. For instance, to produce a real fine cutting edge at 9 with a perfect cutting point at 10, a file is preferably held at an incline so that the point 11 is lower than the point 12 of the file 13 as illustrated in Fig. 8. In moving the file in the direction of the arrow 14, while pressing the file against the tooth 15 of the saw 16, a very fine edge can be produced at 9 and the point 10 can be touched so gently that a perfect sharpness can be assured.

Another file-portion is indicated in dotted lines at 17. This file may be operated from the opposite side of the saw 16 in the direction of the arrow 18 to produce a sharp edge at 19 and a sharp point at 20 on the tooth 21 of the saw 16. This file 17 then is held so as to be lower at the point 22 and higher at the point 23, that being upwardly towards the front from the rear.

In filing saws by hand the points of the teeth of the saw are generally touched at such an incline only, while a file is otherwise moved through the teeth of the saw in a practically horizontal plane.

Providing a machine for filing a saw, a mechanism can easily be designed to allow a fine adjustment for producing perfectly sharp edges on a saw.

The machine as illustrated in Figs. 1, 2 and 3 is provided with means by which files can be moved through a saw in a practically horizontal plane as well as at an incline to the horizontal plane. Bars 24 are provided to support the file-holders in their back and forth shifting movements. To move the file-holders at an incline in relation to the horizontal plane through a saw, the bars 24 are adjusted to an inclined position as indicated at 25 in dotted lines.

In Fig. 1 the bars 24 are shown in their normal horizontal position for filing operations through a saw. The bars 24 are pivotally connected at 26 to the main frame structure 27. The free ends of the bars 24 are supported by a screw adjusting mechanism 29. By an upward movement of the screw adjustment 29 the free ends 28 of the bars 24 are forced upwardly to eventually take the inclined position indicated in dotted lines at 25.

Blocks 30 are shiftably mounted over the top edge of the frame 27 to be supported by the bars 24 as more distinctly illustrated in Fig. 2 to the right, where a block 30 is shown in such a position riding on the bar 24. All blocks 30 are shiftable back and forth from the front to the rear over the frame structure 27. The several blocks are inter-connected by rods 31 as illustrated in Figs. 1 and 3. To produce a uniform back and forth movement on both ends of the frame structure, the blocks are connected by other connecting rods 32 to a crank shaft 33.

The crank shaft 33 may be operated by hand or by motor, a motor being indicated at 34, and the necessary pulleys being indicated at 35 and 36. Two cross-heads 37 and 38 are shiftably mounted on the blocks 30, to move in a sidewise direction back and forth over the frame structure 27. Such a sidewise movement, however, is merely to the extent to guide files at an incline through a saw in a horizontal plane.

The filing at an incline to the horizontal plane described above, to produce extra fine cutting edges, is of little importance compared with the filing at an incline or angle to the longitudinal axis of a saw. File-holders 39 and 40 are illustrated at such an incline or angle to the longitudinal axis of the saw 41, see Figs. 2 and 3.

The file-holder 39 is supported by the cross-head 38, while the file-holder 40 is supported by the cross-head 37.

To move the file-holder 39 with a file through a saw 41 at the angle in which the file-holder 39 is illustrated, the file-holder must naturally be moved in a sidewise direction as the file moves back and forth through the saw. Since for other reasons it is not desirable that the file-holder is moved in a sidewise direction back and forth on the cross-head 38 on each stroke of the file through the saw, provision has been made to move the whole cross-head 38 with the file-holder 39 and the file back and forth in a sidewise direction to the extent necessitated by the inclined movement of the file through the saw.

To produce such a sidewise movement of the cross-head 38, an adjustable bar 42 is provided in the frame structure. The bar 42 must be adjustable to take the different positions equal to the different angles at which the teeth of saws are generally filed.

Mechanics have established a certain number of different inclines or angles for the cutting edges of the teeth of a saw. It is therefore an easy matter to arrange certain adjustments for the bar 42 to allow a setting of the bar 42 at such certain angles.

The two cross-heads 37 and 38 are provided with guiding blocks 43 to ride on the bars 42 as illustrated in Figs. 2 and 3. The file-holder 40 being illustrated at a different angle than the file-holder 39, the corresponding guiding bar 42 is therefore also arranged at a different angle than the bar 42 of the cross-head 38.

On each back and forth stroke of the file-holders with the files, the file-holders are preferably moved in a sidewise direction to the next teeth to be sharpened by the files, which is normally a number equal to two teeth, since every other tooth of a common saw is normally bent or set in the same direction.

The advancing of the file-holders 39 and 40 on the cross-heads 37 and 38 is preferably controlled by ratchet-bars 44. Such ratchet-bars are preferably made exchangeable within this machine. A certain number of different teeth are normally used in saws, so that a certain number of ratchet-bars can be kept on hand to be placed in the machine according to the saw to be handled in the machine. The ratchet-bar is illustrated in Fig. 7 in detail. The bar 44 is provided with slots 45 so that the ratchet bar can move back and forth. Springs 46 are disposed behind the ratchet-bars to normally force the ratchet bars outward. The ratchet bars are disposed within the cross-heads 37 and 38. The file-holders are provided with blocks 47 by which the file-holders are slidably mounted on the cross-heads 37 and 38. Lugs 48 are provided on the file-supporting blocks 47 to engage with the teeth in the ratchet bar 44. By this ratchet engagement the file-holders are normally held suitably engaged with the cross-heads 37 and 38. On each stroke the ratchet bars 44 are hit by the lugs 49 on the frame structure 27, by which the ratchet bars are suitably disengaged from the lugs 48. While being so disengaged for a short moment, the file-holding blocks 47 may be advanced to the next teeth. Since the ratchet bars are merely hit for a moment at the end of each stroke of the file-holders and cross-heads, the ratchet bars move quickly back to engaging position by the action of the springs 46.

So-called sash pulleys with springs are preferably inserted into the cross-heads 37 and 38 at 50, by which the file-holding blocks 47 may be advanced over the cross-heads 37 and 38 by the connecting bands 51.

A saw-supporting frame structure 52 is illustrated in Figs. 4 and 5. This saw-supporting structure is provided with jaws 53 and 54, the jaw 53 being stationary while the jaw 54 being hingedly connected to the other jaw as indicated at 55. A hook 56 is provided on each end of the structure for quickly clamping the jaws 53 and 54 towards each other. The saw-supporting frame structure is preferably adjustable in a vertical direction as by screws indicated at 57 in Fig. 2. To produce an especially fine finish on a saw, an inserted saw can easily be moved upwardly towards the files to a very slight extent suitable for such a refinishing.

For setting the teeth of a saw automatically with the filing of a saw, a setting mechanism is also provided. A simple setter is illustrated in detail in Fig. 6 in relation to an inserted saw with one of the saw-supporting jaws. Such a setting-hammer is preferably provided near or on each of the file-supporting blocks 47 as indicated at 58 in Fig. 3. On each stroke of the file-holders, one of the setting mechanisms must come in contact with one of the jaws 53 or 54. In Fig. 6 the jaw 54 is illustrated in such a close position in relation to the setting mechanism. A hammer 60 is pivotally mounted at 61 on such an extension block 58 on the file-holding blocks 47. A shiftable bar or pin 62 is disposed in the block 58. Another shiftable bar 63 is disposed above the first bar in the block 58. The bar or pin 62 is disposed so that it will hit one of the jaws 53 or 54 so as to shift rearwardly through the block 58. By such rearward movement the hammer 60 is hit to such an extent that it will strike against the rearward end 64 of the setting pin 63. The setting pin 63 is thereby moved or forced against one of the teeth so that such a tooth of the saw may be properly set. The hammer 60 falls normally into operative position as the file-supporting mechanism moves away from the saw.

Having thus described my invention, I claim:

1. In a saw-sharpening machine, a frame structure embodying uprights and a top member extending throughout the depth from the front to the rear at each end of the frame structure, guiding blocks shiftably mounted on the said top members of the frame structure for movements back and forth between the front and rear of the frame structure, actuating means for uniformly moving the several blocks, cross-heads shiftably mounted on the blocks between the said ends and across the whole length of the frame structure for transverse movements, and file-supporting means shiftably mounted on the said cross-heads and adapted to be adjusted at an angle to the frame structure to align with the cutting edges of a saw when disposed within the frame structure.

2. In a saw-sharpening machine, a frame structure embodying uprights and a top member extending throughout the depth from the front to the rear at each end of the frame structure, guiding blocks shiftably mounted on the frame structure for movements back and forth between the front and rear sides of the frame structure, supporting bars on the said top members of the frame structure adapted to be tilted into inclined positions from the front and from the rear upwardly towards the middle of the frame structure so as to cause the said blocks to move in such an incline, and file-supporting means mounted on said blocks between the said ends and across the whole length of the frame structure.

3. In a saw-sharpening machine, a frame structure embodying uprights and a top member extending throughout the depth from the front to the rear at each end of the frame structure, guiding blocks mounted on the frame for shifting movements back and forth between the front and rear, cross-heads mounted on the said blocks across said top members on the opposite ends of the frame structure for shifting movements back and forth parallel between the front and rear, file-supporting means mounted on said cross-heads for shifting movements longitudinally on the cross-heads, and a ratchet-control between the file-supporting means and the cross-heads and adapted to control the advancing of the file-supporting means according to the teeth of an inserted saw.

4. In a saw-sharpening machine, a frame structure embodying uprights and a top member extending throughout the depth from the front to the rear at each end of the frame structure, a saw-holding frame structure between the opposite ends within the first-named frame structure, adjusting means for adjusting the saw-holding frame structure vertically within the first-named frame structure, a filing mechanism mounted on the first-named frame structure embodying a ratchet-control adapted to hold the filing mechanism aligned with the different teeth of an inserted saw, means for releasing the ratchet control on each stroke of the filing mechanism, and a teeth-setting mechanism for setting the teeth of an inserted saw on each stroke of the filing mechanism.

In testimony that I claim the foregoing as my invention I have signed my name in the presence of two subscribing witnesses.

MICHAEL TAYLOR.

Witnesses:
ESTHER HATTENBACH,
O. H. KRUEGER.